J. E. MILLS.
PROCESS FOR EXTRACTING OIL FROM COTTON SEED OR OTHER OLEAGINOUS MATERIAL.
APPLICATION FILED AUG. 23, 1907.
913,751.
Patented Mar. 2, 1909.
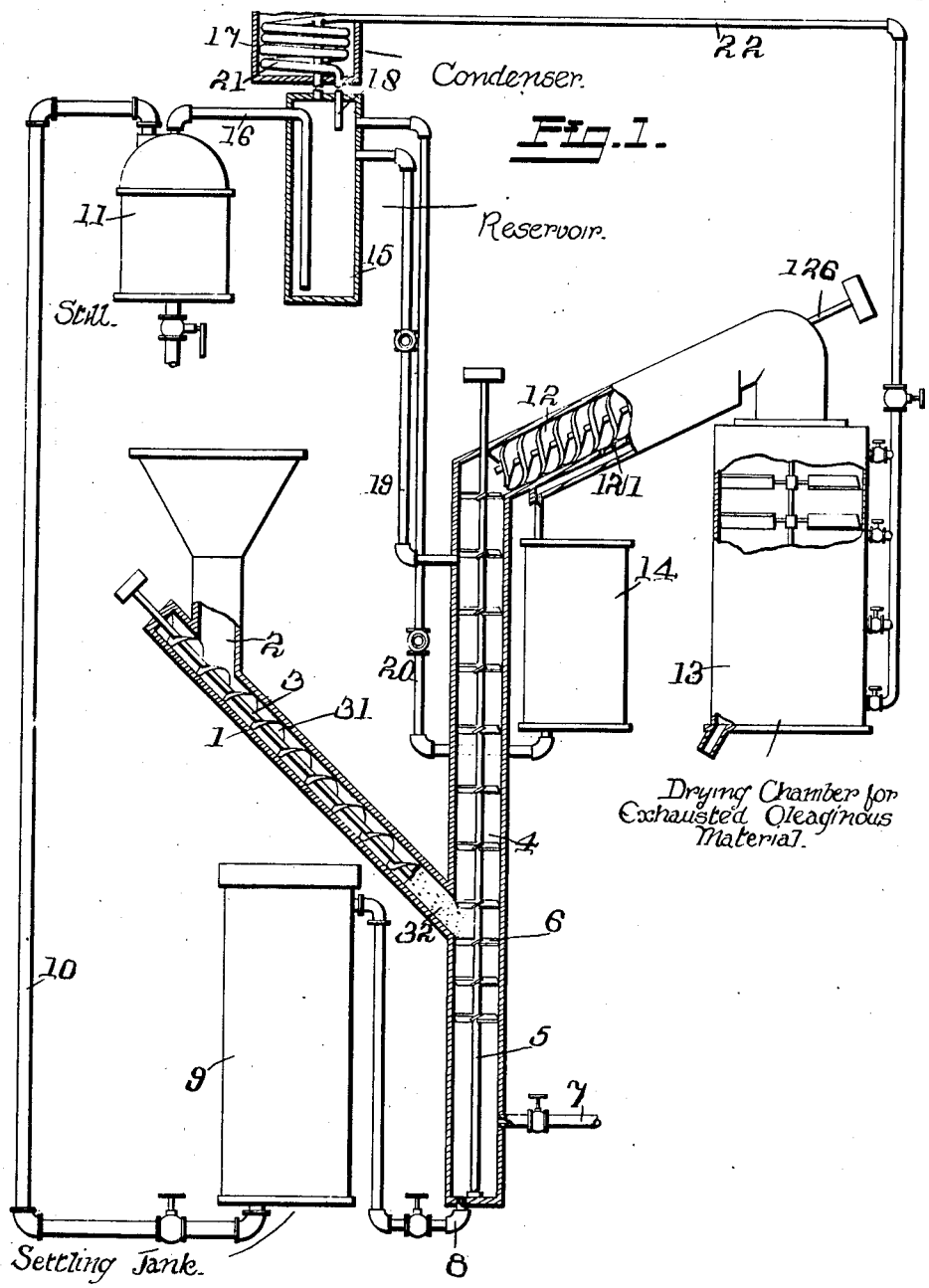

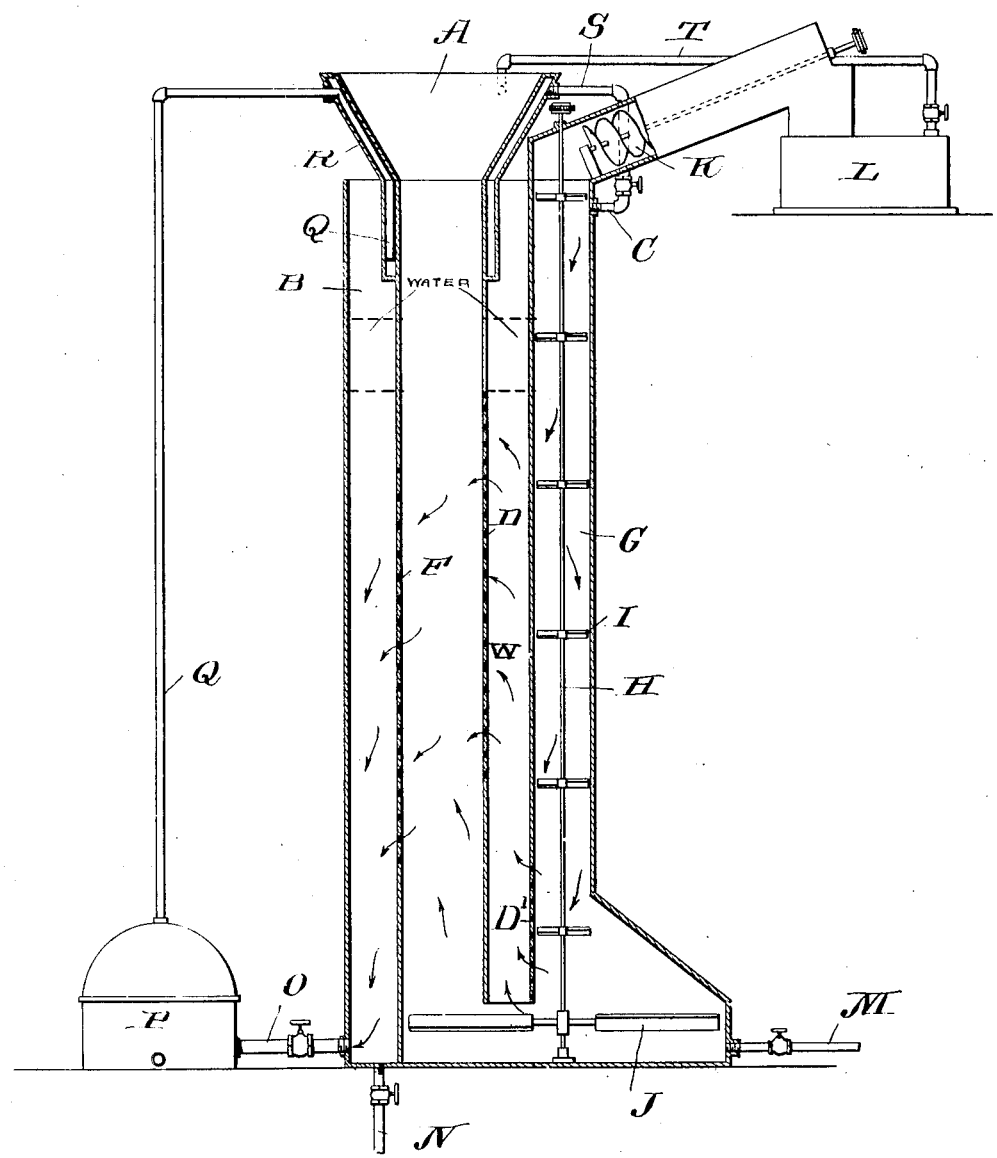

UNITED STATES PATENT OFFICE.

JAMES EDWARD MILLS, OF CHAPEL HILL, NORTH CAROLINA, ASSIGNOR OF ONE-FOURTH TO H. B. BATTLE, OF MONTGOMERY, ALABAMA.

PROCESS FOR EXTRACTING OIL FROM COTTON-SEED OR OTHER OLEAGINOUS MATERIAL.

No. 913,751.  Specification of Letters Patent.  Patented March 2, 1909.

Application filed August 23, 1907. Serial No. 389,910.

*To all whom it may concern:*

Be it known that I, JAMES EDWARD MILLS, a citizen of the United States, residing at Chapel Hill, in the county of Orange and State of North Carolina, have invented certain new and useful Improvements in Processes for Extracting Oil from Cotton-Seed or other Oleaginous Material; and I do hereby declare the following to be a full, clear, and exact description of the invention, such as will enable others skilled in the art to which it appertains to make and use the same.

My invention relates to a process for extracting cotton seed oil from the cotton seed, from the cotton seed meats, or from cotton seed meal, which is left after the larger portion of the oil has been pressed out, or extracting oil from other oleaginous seeds or material, and the objects of my invention are to produce a quick, safe, efficient and cheap process, which shall be capable of being used on a commercial scale, and which shall be certain in action and easy to carry out.

I attain the above objects by passing the cotton seed, its meats or meals, or other oleaginous seeds or material, through any suitable apparatus, and compelling the same to come into intimate contact with liquid, or vaporous, carbon tetrachlorid $CCl_4$, or both, whereby the oil from the same is taken up by the said carbon tetrachlorid; and I then suitably recover the said oil from the same, and also recover any carbon tetrachlorid that may be carried out of the apparatus by the cotton seed, its meats, or meal, or other oleaginous seeds or material, as will be more fully hereinafter disclosed.

In order to simplify the specification, I will disclose in the following description my process as applied to the extraction of the oil from cotton seed, its meats, or meal, and wherever one of these substances is mentioned, of course the others are to be understood.

Referring to the accompanying drawings forming a part of this specification; Figure 1, is a sectional view of one form of apparatus illustrating the principles involved in my process, and Fig. 2 is a like view of another form of apparatus serving the same purposes.

In carrying out my process, I may employ any suitable apparatus whatever, but in both the forms illustrated the cotton seed, its meats, or meal, continually move in one direction and the carbon tetrachlorid in an opposite direction, and the action is such that the fresh liquid, or vaporous, carbon tetrachlorid, first meets the practically exhausted seed, meats or meal, and therefore practically completes the extraction of oil therefrom, all as will more fully appear hereinafter.

Referring to the accompanying drawings, Fig. 1, 1 represents a tube or compartment preferably of a circular cross section, supplied with a suitable opening and feed at 2 for the cotton seed, its meats, or meal, and with a screw shaft 3, provided with a screw 31, the latter, rotated by any suitable power, and reaching preferably not quite to the opening of the tube 1 into compartment 4. The compartment 4 is placed preferably in a vertical or nearly vertical position, and is also preferably circular in shape, and extends preferably some distance below the opening of tube 1 into this compartment, as shown. In the chamber or compartment 4 is located a vertical shaft 5, rotated by any suitable power, and carrying paddles 6. This chamber or compartment 4 is provided at its bottom with a steam or water inlet pipe 7, and with an outlet pipe 8 for the carbon tetrachlorid containing oil, said pipe leading into the settling tank 9. From this tank the carbon tetrachlorid and its contained oil is pumped through the pipe 10 to the still 11. The chamber or compartment 4 is provided at its top with a conveyer 12 which carries the extracted seed, meats, or meal, to a suitable drying chamber 13. Any excess of carbon tetrachlorid carried over during the passage of the seed, meats, or meal, through the conveyer 12, is drained through the perforated portion 121 of the conveyer 12, and is caught and carried to the settling tank 14. 15 is a reservoir for carbon tetrachlorid connecting with the still 11 through the pipe 16, with the condenser 17, through the pipes 18, with the chamber or compartment 4 through the pipe 19, and with the settling tank 14 through the pipe 20. The drying chamber 13 connects with the coils 21 in the condenser 17 through the pipe 22. All pipes are suitably provided with valves, and any suitable apparatus (not shown in the drawings) is provided to pump the carbon tetrachlorid in the direction desired when gravity is not sufficient to cause its continuous flow. The screws 31 and conveyers 12 and shaft 5 are kept in motion by any suitable power.

In carrying out my process with this apparatus the cotton seed, its meats, or meal, is first crushed or disintegrated to a suitable fineness by apparatus not shown in the drawing. The cotton seed, its meats, or meal, thus prepared enters the machine through the funnel tube 2 and is carried by the screw 31 through the tube 1 into compartment 4. The screw 31 ends slightly before reaching compartment 4, in order that a slightly compacted cake of meal 32 may be formed at the junction with compartment 4. Compartment 4 is filled with carbon tetrachlorid, and the weight of this column forces some of the liquid through the meal in the lower portion of the tube 1. Therefore, the extraction of the oil from the cotton seed, its meats, or meal, really commences in the tube 1. The meal is advanced through the tube 1, with sufficient rapidity to prevent the appearance of any of the carbon tetrachlorid at the opening 2. This is easily done since the carbon tetrachlorid penetrates the meal in the tube 1 only very slowly. The cotton seed, its meats, or meal, after reaching compartment 4, at once attempts to rise to the top of the compartment, since it is lighter than the liquid carbon tetrachlorid with which the compartment is filled. Although this meal, practically exhausted of its oil, eventually reaches the top of this chamber, its passage is obstructed and rendered somewhat slow, by the paddles 6, attached at intervals to the slowly revolving shaft 5, which paddles are set at an angle to the shaft, and are of sufficient width to materially obstruct the rise of the meal. These paddles, besides preventing the too rapid rise of the meal, insure its intimate mixture and thorough contact with the carbon tetrachlorid, and at the same time prevent any possible clogging of the compartment 4, since by the inclination of the paddles the meal is forced upward finally to the top of the column.

Fresh and preferably hot carbon tetrachlorid continually enters at 19, near the top of the cylinder, or chamber 4, and carbon tetrachlorid containing the extracted oil is continually drawn from the lower end of the compartment 4, at the pipe 8. In other words, the vapors and liquid of fresh hot carbon tetrachlorid continually entering the compartment at 19, and meeting first the meal, which in its passage through the carbon tetrachlorid below has already been largely exhausted of its oil, completes the extraction of the oil from the meal about to leave the apparatus. Said meal, deprived of its oil, is continually removed from the top of chamber 4, by the conveyer 12, receiving its power from the shaft 126, and after draining in its passage through the perforated portion 121 of the conveyer, is delivered finally into the separator 13, where the carbon tetrachlorid in the meal is separated out, and returned through the pipe 22 to the condenser 17 and finally to the reservoir 15. The hot carbon tetrachlorid entering the said compartment 4 gradually works its way downwards through said compartment for two reasons. First, the action of gravity, as the carbon tetrachlorid is drawn off at the bottom of the compartment 4 compels the downward flow. Second, the density of the successive layers of the carbon tetrachlorid and its contained oil increases as it passes from the top of column 4 to the bottom, and thereby upward currents of the liquid are prevented. This is accomplished, in spite of the fact that the contained oil decreases the density of the carbon tetrachlorid, by causing the carbon tetrachlorid to become cooler as it descends. Thereby the decrease in density of the carbon tetrachlorid as it descends and becomes richer in oil, is balanced, or more than balanced, by the increase of density caused by the fact, that the carbon tetrachlorid at the same time becomes cooler. This constitutes an important advantage, for otherwise the carbon tetrachlorid entering at the top of chamber 4, would be of greater density than the carbon tetrachlorid which contains the oil nearer the bottom of said compartment, and therefore the latter would show an aggravating tendency to rise to the top of chamber 4, which tendency could only be overcome, if at all, by an increased rapidity of circulation of the carbon tetrachlorid, and this would materially increase the cost of the operation.

The carbon tetrachlorid and its contained oil, is as above stated, drawn off from the bottom of compartment 4, through the pipe 8 into the settling tank 9. That portion of compartment 4, below the entrance of tube 1, itself serves as a settling tank and only the finest silt and residue from the meal finally finds its way into the settling tank 9, from the top of which it is removed and again caused to enter the machine at 2. The carbon tetrachlorid containing the dissolved oil is removed from the bottom of the tank 9 to the still 11, where it is distilled from the oil, under diminished pressure when advantageous, and the condensed carbon tetrachlorid and some vapor is caused to enter the top of compartment 4 hot. This may be effected by any suitable arrangement whatever, but in the apparatus shown in the drawing is effected by causing the vapors from the still 11 to pass to the bottom of the reservoir 15, where they are partially condensed as they pass through the contained carbon tetrachlorid, keeping it hot. Some of the uncondensed vapors pass directly through the pipe 19, into the chamber 4 where they serve the useful purpose of further heating the meal and carbon tetrachlorid contained therein. The remainder of the uncondensed vapor of the carbon tetrachlorid passes into the condenser 17 where it is condensed and returned to the reservoir 15. The oil, still containing some carbon tetrachlorid, is removed from the bottom of the still 11 to other apparatus, not shown, for final purification. In this apparatus may be provided the usual means for agitating the oil, and also for blowing a current of air or steam over the oil, thereby carrying away the vapors of the carbon tetrachlorid to be condensed and finally returned to the reservoir 15. The carbon tetrachlorid is removed from the extracted meal in any suitable drying or separating apparatus 13, the details of which are not shown since they must vary depending on whether water is used at the top of chamber 4 or not. The carbon tetrachlorid vapors removed from the meal in this drying or separating apparatus are also condensed and returned to the reservoir 15, finally to enter the column 4 again.

This same process may also be carried out in the apparatus shown in Fig. 2, wherein A represents a central chamber or compartment, and B and W represent adjoining chambers or compartments. Between the chambers A and B and W are small passages F and D, formed by perforating the walls of the chamber A. G represents a third chamber preferably circular in cross section and located to one side of the chamber B. In the chamber or compartment G, is located a vertical shaft H, rotated by any suitable power, and carrying paddles I. The shaft, at its bottom, is provided with the large paddles J, and the compartment at its top is provided with the conveyer K delivering into the tank or separator L, as shown. The compartment G is enlarged at its bottom, as shown, and is provided with a steam or water pipe M, and the compartment B is provided with a steam pipe N at its bottom, and also with an outlet pipe O, for the carbon tetrachlorid, as shown. All of these pipes are provided with valves, and the pipe O leads into the still, or other separating apparatus P. From this still, the pipe Q leads to and extends to the bottom of the jacket R, surrounding the upper end of chamber A, as shown, and from this jacket R, leads the pipe S, which delivers into the upper end of the chamber or compartment G, as illustrated. A pipe T connects the separator L with the said jacket R at any convenient point. In carrying out my process with this apparatus, I cause the meal to enter at the top of chamber, or compartment A. This compartment contains carbon tetrachlorid, and the entering meal, or meat, is gradually forced, by the meat or meal, coming after it, through the said carbon tetrachlorid to the bottom of said chamber; for, although the liquid carbon tetrachlorid is very heavy, and a small amount of the meal will float on the surface of the same, yet, as the meal continually enters the chamber, the weight of the descending meal forces the previously floating meal, finally, to the bottom of the compartment, from where it is continually removed by the paddles J, attached to the revolving shaft H. These paddles eventually bring the meal to the bottom of the chamber G, which also contains carbon tetrachlorid and may contain a layer of water at the top, not shown, and since the meal is lighter than the carbon tetrachlorid it tends to rise to the surface of the same in the said chamber G, but practically exhausted of its oil. Although this meal eventually reaches the top of this chamber, its passage is obstructed and rendered somewhat slow, by the paddles I, attached at intervals to the shaft H, which paddles are set at an angle to the shaft, and are of sufficient width to materially obstruct the rise of the meal.

Fresh and hot carbon tetrachlorid continually enters at C, near the top of the cylinder, or chamber G, and carbon tetrachlorid containing the extracted oil is continually drawn from the compartment B. In other words, the vapors and liquid of fresh hot carbon tetrachlorid continually entering the compartment at C, and meeting first the meal, which in its passage through the carbon tetrachlorid below, has already been largely exhausted of its oil, completes the extraction of the oil from the meal about to leave the apparatus. Said meal is made to pass by means of any suitable conveyer, as that shown, through the water supported at the top of said chamber should said water be present, and the carbon tetrachlorid is driven from the meal partly by the mechanical action of the water, through the fact that the water is kept hot and therefore vaporizes the carbon tetrachlorid. The vaporized carbon tetrachlorid is of course later condensed and recovered, and the water is afterward passed from the meal, or the meal may be simply delivered into the separator L, where the carbon tetrachlorid contained in the meal is separated out by any suitable means and returned through the pipe T to the jacket R, and finally to the meal in chamber G.

The water at the top of chamber G may be introduced either as such, or as steam. The water or steam may be caused to enter the chamber G through the pipe M, situated where most desirable, but shown in the drawing as near the bottom of chamber G. The steam condensing in its passage through the carbon tetrachlorid and meal, heats them, and at the same time produces a more rapid rise of the meal toward the top of the chamber G. The presence of water appears slightly to aid the extraction. A layer of water may also be kept at the top of compartments B and W in order to prevent the evaporation of the carbon tetrachlorid.

In each apparatus the operation is substantially the same, and the principles involved are identical. In the machine shown in Fig. 2, however, as well as in the machine shown in Fig. 1, the meal or meats do not take any longer than five minutes to complete the circulation through the various compartments, and each apparatus is designed to handle six tons of meal in ten hours, the meal entering each machine at the rate of about twenty pounds per minute.

Referring more particularly to the machine shown in Fig. 2, the fresh carbon tetrachlorid, more or less charged with cotton seed oil, after having passed through chamber G, passes on into chamber, or compartment B, either very slowly through the meal at the bottom of chamber A, because the meal is there compressed by the weight of the meal above it, or it passes more rapidly by going through the fine openings D' in the wall of compartment G, and thence through the other openings D across the meal in compartment A, where the meal is less compressed than at the bottom, and finally it passes into the compartment B, as shown by the arrows, having become well saturated with oil in the mean time. The carbon tetrachlorid and its contained oil is as above stated, next drawn off from the compartment B, and led to a suitable still P, where the carbon tetrachlorid is separated from the oil, and returned in a hot and more or less vaporous state to chamber G. The heat given out during the condensation of the vapor, when desirable, is made use of to heat the descending meal by circulating the said vapors around the entering meal in the jacket R at the top of chamber A, as shown, but not sufficient heat is withdrawn in this manner, to prevent the vapors and liquid entering chamber G hot, since in this condition they best extract substantially all the oil from the nearly exhausted meal.

The rapidity with which the carbon tetrachlorid containing oil should be drawn from compartment 4, or B, and the amount of oil which such carbon tetrachlorid should contain, will depend largely on the amount of oil in the meal or in the meats used. The rule to be followed should be that the carbon tetrachlorid drawn off should contain at least as large a percentage of oil by weight as that left contained in the incoming meal, provided that this percentage of oil in the carbon tetrachlorid does not so alter its specific gravity as to aggravate the tendency of the more saturated carbon tetrachlorid to rise to the top of chambers 4, and G as hereinbefore alluded to and explained. It is obvious that any other equivalent solvent having a specific gravity greater than the exhausted meal or meats of the oleaginous material operated upon might be used instead of carbon tetrachlorid without departing from the spirit of my invention.

I do not desire to be understood as limiting myself to the exact details of the process herein disclosed, for it is evident that the same could be varied by those skilled in the art without departing from the spirit of my invention.

What I claim is:—

1. The process of extracting oil from oleaginous material, which consists in passing carbon tetrachlorid downward, at any suitable temperature, through a suitable column; introducing said material into said column a considerable distance below the top thereof, to cause by the buoyancy of the said material in the carbon tetrachlorid the passage of the same through the said column, and in an upward direction; and finally recovering the extracted oil from the said carbon tetrachlorid, substantially as described.

2. The continuous process of extracting oil from oleaginous material, which consists in passing carbon tetrachlorid, at any suitable temperature, downward through a suitable column by the action of gravity, and simultaneously introducing said material into said column a considerable distance below the top thereof, to cause by the buoyancy of the said material in the carbon tetrachlorid the passage of the same through said column in an upward direction; also causing said oleaginous material to come into contact with water near the top of said carbon tetrachlorid; and finally recovering the oil from the carbon tetrachlorid, substantially as described.

3. The process of extracting oil from oleaginous material and recovering the solvent, which consists in passing carbon tetrachlorid at any suitable temperature downward into a suitable column; introducing said material into said column a considerable distance below the top thereof, to cause by the combined action of gravity and the buoyancy of the oleaginous material in the said carbon tetrachlorid the passage of the material to the top of the said column; simultaneously permitting the said carbon tetrachlorid to dissolve the oil in the oleaginous material; and removing said oleaginous material more or less exhausted of its oil from the top of said column; then drawing off the carbon tetrachlorid and its contained oil from the bottom of said column and recovering the said carbon tetrachlorid from the contained oil, substantially as described.

4. The process of extracting oil from oleaginous seed material which consists in passing carbon tetrachlorid in a certain direction, through a suitable apparatus, and in passing the constituents of said seed through said apparatus in contact with said carbon tetrachlorid and in a direction opposite to that of the latter, whereby the practically exhausted seed material is subjected to the action of the fresh carbon tetrachlorid, allowing the densities of the successive layers of said carbon tetrachlorid and its contained oil to increase as it passes through said apparatus, and permitting the action of gravity on said layers to prevent upward currents in the liquid, then withdrawing the carbon tetrachlorid containing the oil, and finally separating the oil from the same, substantially as described.

5. The process of extracting oil from cotton seed material, which consists in passing hot carbon tetrachlorid, in a certain direction through a suitable apparatus, and simultaneously passing the said seed material through the same in an opposite direction and in intimate contact with the carbon tetrachlorid, whereby the practically exhausted seed material is subjected to the action of the fresh and hot carbon tetrachlorid, allowing the densities of the successive layers of said carbon tetrachlorid and its contained oil to increase as it passes through said apparatus, and permitting the action of gravity on said layers to prevent upward currents in the liquid, then withdrawing the oil and carbon tetrachlorid into a suitable still and there separating the same, and finally returning the recovered carbon tetrachlorid to said apparatus, substantially as described.

6. The process of extracting oil from cotton seed material, which consists in passing the same through a suitable apparatus in a certain direction and simultaneously passing carbon tetrachlorid through the same in an opposite direction, said carbon tetrachlorid being in a fresh, hot, and more or less vaporous state when it enters the apparatus and contacts with the practically exhausted seed material, allowing the densities of the successive layers of said carbon tetrachlorid and its contained oil to increase as it passes through said apparatus, and permitting the action of gravity on said layers to prevent upward currents in the liquid, then withdrawing the oil and carbon tetrachlorid, to a suitable still and separating the one from the other, then returning the hot carbon tetrachlorid to a suitable condenser, and extracting a portion of its heat therefrom, and finally passing said recovered and more or less vaporous carbon tetrachlorid again through the apparatus, substantially as described.

7. The continuous process of extracting oil from cotton seed material, and recovering the solvent, which consists in continuously passing carbon tetrachlorid at any suitable temperature through a suitable apparatus in a certain direction, and simultaneously passing the said seed material, through the same in an opposite direction, and through a layer of water on top of said carbon tetrachlorid, allowing the densities of the successive layers of said carbon tetrachlorid and its contained oil to increase as it passes through said apparatus, and permitting the action of gravity on said layers to prevent upward currents in the liquid, then continuously removing the exhausted seed material, from the apparatus to a suitable separator, and there separating out any carbon tetrachlorid that may be contained in the seed material, and also continuously removing the carbon tetrachlorid containing the oil to a suitable still and there separating the same from said oil, and finally returning the recovered carbon tetrachlorid to the apparatus, substantially as described.

8. The continuous process of extracting oil from cotton seed material, which consists in passing carbon tetrachlorid at any suitable temperature through a suitable apparatus and in a certain direction by the action of gravity, and simultaneously passing the said seed material, through the same and in an opposite direction by the combined action of gravity and the buoyancy of the seed material, in the carbon tetrachlorid, allowing the densities of the successive layers of said carbon tetrachlorid and its contained oil to increase as it passes through said apparatus, and permitting the action of gravity on said layers to prevent upward currents in the liquid, and finally recovering the oil from the carbon tetrachlorid, substantially as described.

9. The continuous process of extracting oil from cotton seed material, which consists in continuously passing carbon tetrachlorid at any suitable temperature through a suitable apparatus under the action of gravity, and simultaneously passing the said seed material in an opposite direction through said apparatus under the combined action of gravity and buoyancy of said seed material, and through a layer of water; allowing the densities of the successive layers of said carbon tetrachlorid and its contained oil to increase as it passes through said apparatus, and permitting the action of gravity on said layers to prevent upward currents in the liquid, and finally recovering the oil thus extracted, substantially as described.

10. The continuous process of extracting oil from oleaginous materials, which consists in passing hot carbon tetrachlorid through a suitable apparatus in a given direction, simultaneously passing said materials through said apparatus in an opposite direction and in intimate contact with said carbon tetrachlorid, thereby successively increasing the quantity of oil absorbed, and successively lessening the density of the mixed oil and solvent, retarding the natural tendency of said materials to rise in the solvent, allowing the mixed oil and solvent to cool, and allowing the increased density of the same due to said cooling, to overcome the said decreased density of the mixture due to said increased quantities of oil absorbed, and thereby causing the said cooling to automatically aid in the circulation of the said mixture through the machine, under the action of gravity, substantially as described.

11. The process of extracting oil from cotton seed material, and recovering the solvent, which consists in passing carbon tetrachlorid at any suitable temperature into a suitable chamber or compartment, causing it to come into contact with said material, permitting the said carbon tetrachlorid to cool, and by the combined consequent increase in density, the action of gravity and the buoyancy of the said material in the said carbon tetrachlorid permitting the same to be carried to the bottom of the said chamber or compartment, simultaneously permitting the said carbon tetrachlorid to disssolve the oil in the oleaginous material, and simultaneously permitting the more or less extracted oleaginous material to rise to the top of said compartment, then drawing off the carbon tetrachlorid and its contained oil from the bottom of the said compartment and recovering the said carbon tetrachlorid from the dissolved oil, substantially as described.

In testimony whereof, I affix my signature in presence of two witnesses.

JAMES EDWARD MILLS.

Witnesses:
GEO. B. PITTS,
L. C. BRADY.